Patented Sept. 7, 1937

2,091,969

UNITED STATES PATENT OFFICE 2,091,969

SAPONIFYING ESTERS OF CELLULOSE

Henry Dreyfus, London, England

No Drawing. Application January 4, 1935, Serial No. 328. In Great Britain January 13, 1934

12 Claims. (Cl. 8—20)

This invention relates to improvements in saponifying esters of cellulose and is more particularly concerned with processes for the elimination of nitro groups from nitrocellulose products, for example filaments, threads, yarns, films and the like, or products containing nitrocellulose.

In the manufacture of nitrocellulose artificial silk, as is well known, the artificial silk as originally spun consists of nitrocellulose and subsequent to the spinning operation the artificial silk is subjected to a denitration process designed to reduce the inflammability of the artificial silk. Normally the denitration is carried practically to completion and is effected with the aid of sulphides and hydrosulphides, particularly those of sodium and ammonium.

I have found that a very efficient removal of nitro groups may be obtained from nitrocelluloses by treating them with organic bases, and that such a saponification treatment may be applied with particular advantage to artificial silk and other products of the type referred to above. By the process of the invention threads and like products, of high tenacity and extensibility, and having a very desirable handle may be obtained.

The organic bases which may be used in accordance with the present invention include particularly the aliphatic bases such as mono-methylamine, mono-ethylamine, mono-propylamine and the corresponding di- and tri-alkylamines. Aromatic bases such as aniline or even the alkylated aromatic bases such as dimethyl aniline do not give such good results as non-aromatic bases and are slower in their action. Cyclic bases which are non-aromatic, however, are useful, as for example pyridine, piperidine and their homologues and analogues. The N-alkyl piperidines are also of considerable value. The bases which contain two or more amino or basic groups, for example ethylene diamine and other diamines of the aliphatic series, and corresponding bodies in which one or more of the hydrogens of one or more of the amino groups are substituted as for example by means of alkyl groups, and piperazine and its homologues and analogues are also useful.

The organic amines may be in any suitable medium. Thus the medium employed may be an organic liquid which contains hydroxy groups, for example ethyl or methyl alcohol. However, the most advantageous medium for use in accordance with the present invention is water. If desired the saponification may be effected with the aid of vapours of the saponifying agent. The vapours may be associated with water vapour or with the vapour of an alcohol or other hydroxy compound or with any other suitable diluent. Where the saponification is carried out in the liquid phase with an agent such as mono-methylamine, which has a very strong swelling action upon the nitrocellulose, it is essential to use a diluent with the amine. However, some of the higher amines have not such a pronounced swelling action upon the nitrocellulose and may be used alone or diluted with a comparatively small amount of water or other suitable diluent.

The saponifying action of the amines upon the nitrocellulose may be accelerated by means of certain metals or metal compounds. Copper, especially in the cupric state, is a particularly valuable agent in this respect. Thus, for example, copper oxide or cupric sulphate may be dissolved in aqueous methylamine or aqueous ethylene diamine to bring about a rapid saponification. Usually a small quantity of the copper is sufficient to give the accelerating action, for example a concentration of the copper or copper compound of about 0.05 to 0.5% on the bath. In a similar way other metals or metal compounds accelerate the reaction, for example silver, nickel or zinc. The metal or metal compound may be, and preferably is, dissolved in the bath in which the saponification takes place. However, if desired it may be previously incorporated in the filaments, threads, yarns or other materials undergoing treatment. For instance the desired amount of copper or copper compound or other appropriate metal or metal compound may be dissolved or suspended in the spinning solution from which the nitrocellulose filaments are produced. Or alternatively the filaments or other materials, previous to the saponification treatment, may be impregnated with the metal or metal compound in any appropriate manner. Such methods of incorporating the metal or metal compound in or on the filaments or other materials previous to the saponification treatment are more particularly useful where the saponification is to be carried out with the aid of a vaporous saponifying agent.

As indicated above some of the amines, and especially those of relatively low molecular weight, have a pronounced swelling or solvent action upon the nitrocellulose and when employed in the liquid phase have to be diluted with a suitable diluent, while other amines have a much lower swelling or solvent power. If desired the swelling or solvent power of any amine may be increased by having present with the amine a solvent or swelling agent for the nitrocellulose.

Thus for example in the saponifying bath there may be present acetone, ether, alcohol, dioxane, ethylene methylene ether or similar cyclic ethers or their homologues, the mono- or di-ethers, esters or ether-esters of olefine or polyolefine glycols, for example the mono- or di- methyl or ethyl ethers of ethylene glycol, glycol mono- or di- acetate, methyl glycol mono-acetate, diacetone alcohol, amyl acetate, butyl propionate and the like. Preferably the solvent or swelling agent employed is without reaction upon the amine under the conditions of the saponification treatment. The concentration in which either the amine alone or the amine and the additional swelling agent or solvent employed is preferably such that incipient solution of the nitrocellulose does not occur.

The saponification treatment may be effected at any suitable temperature and concentration. In general the higher the temperature and concentration, the more rapid is the saponification. While therefore the use of atmospheric or even lower temperatures is not excluded it is generally preferable to work at higher temperatures. Monomethylamine, for example, is preferably used at a temperature of 50–60° C., in 15–30% aqueous solution, while ethylene diamine may be used with advantage in the same concentration at temperatures up to 90° C. Where the temperature of the saponifying treatment is such as to give rise to an undue vapour pressure of the amine saponifying agent the bath may be covered with an oil or other relatively non-volatile medium so as to reduce evaporation from the bath to a minimum.

Instead of or in addition to having copper, silver or other metal compounds present to accelerate the saponifying action inorganic alkaline substances may be present for this purpose, for example caustic soda, caustic potash, sodium silicate, sodium aluminate, sodium oleate and generally the sodium and potassium soaps or other alkaline compounds or salts which are compounds of a relatively strong base such as sodium or potassium with a relatively weak acid. Such alkaline substances may be present in a comparatively low proportion. For example when using an aqueous mono-methylamine solution of about 15–25% strength the bath may be made up so as to contain 0.1–0.5% up to 1 or 1½% of caustic soda so as to accelerate the saponification process.

The materials may be subjected to the saponification treatment in any suitable form. For example hanks may be treated by a simple bath treatment or spinning box cakes or other packages may have the saponifying agent circulated continuously or intermittently through the package or may be simply immersed in a bath. The filaments, threads, yarns or the like may if desired be treated on perforated bobbins or similar perforated packages through which the saponifying agent may be circulated. Where the speed of the reaction permits, the saponifying treatment is preferably carried out on travelling materials and the conditions of the saponification adjusted so that the saponification takes place in a relatively short time. In treating travelling filaments or other materials it is of considerable importance to treat the materials in warp formation of yarns in a single operation. For example a very large number of yarns or bundles of filaments may be aligned and carried together through the saponifying bath. At the beginning and end and if desired at intermediate points in the bath they may be carried round rollers or other driving means extending across the whole warp. By this means a very rigid control is obtained over the tension operation upon the filaments during their saponifying treatment and the uniformity of the products is correspondingly improved and particularly their dyeing properties. Especially valuable results are obtained if the materials, either during the spinning, for example during wet spinning or subsequent to the spinning operation, are subjected to a stretching treatment, for example are stretched under the action of softening agent and a suitable tension to 200, 300 or 500% or more of their original length.

The following examples illustrate the invention:

*Example 1*

A nitrocellulose yarn in hank form is suspended in a bath containing a 20–30% aqueous solution of mono-methylamine and 0.05–0.5% of copper in solution. The temperature of the bath is between 50 and 60° C. The materials are allowed to remain immersed in the bath until the desired degree of denitration is effected. They are then removed from the bath, washed to remove traces of methylamine and copper and dried.

*Example 2*

The process is carried out as in Example 1, except that the bath comprises a 20–30% aqueous solution of ethylene diamine in which is dissolved a small proportion of nickel oxide.

While the invention particularly contemplates the complete or substantial elimination of the nitro groups of the nitrocellulose, it is not confined thereto and includes removal of the nitro groups to any desired degree and particularly to such a degree that the product exhibits an affinity for cotton colours. In the treatment of films, for example, it is sometimes desirable to effect an incomplete saponification and the present invention is very useful for such a purpose. In addition to the saponification of products composed wholly of nitrocellulose the invention includes the treatment of any materials such as mixed yarns containing nitrocellulose associated with other materials whether or not such other materials are affected by the saponifying treatment and also the treatment of the materials containing mixed cellulose esters containing the nitro group, as for example a cellulose nitroacetate.

What I claim and desire to secure by Letters Patent is:—

1. Process of producing improved artificial products of high tenacity and extensibility which comprises subjecting to saponification filaments, threads, ribbons and like material having a basis of nitrocellulose by treating the same with a nitrogenous organic base in the liquid phase.

2. Process of producing improved artificial products of high tenacity and extensibility which comprises subjecting to saponification filaments, threads, ribbons, films and like products having a basis of nitrocellulose by treating the products in a bath containing a nitrogenous organic base under such conditions as to swell the products without incipient solution.

3. Process of producing improved artificial products of high tenacity and extensibility which comprises subjecting to saponification filaments, threads, ribbons, films and like products having a basis of nitrocellulose by treating the products with a liquid medium containing a nitrogenous lower aliphatic base.

4. Process of producing improved artificial products of high tenacity and extensibility which comprises subjecting to saponification filaments, threads, ribbons, films and like products having a basis of nitrocellulose by treating the products with a liquid medium containing a lower aliphatic mono-amine.

5. Process of producing improved artificial products of high tenacity and extensibility which comprises subjecting to saponification filaments, threads, ribbons, films and like products having a basis of nitrocellulose by treating the products with a bath containing a lower aliphatic mono-amine under such conditions as to swell the products without incipient solution.

6. Process of producing improved artificial products of high tenacity and extensibility which comprises subjecting to saponification filaments, threads, ribbons, films and like products having a basis of nitrocellulose by treating the products with a liquid medium containing mono-methyl-amine.

7. Process of producing improved artificial products of high tenacity and extensibility which comprises subjecting to saponification filaments, threads, ribbons, films and like products having a basis of nitrocellulose by treating the products with a bath containing mono-methylamine under such conditions as to swell the products without incipient solution.

8. Process of producing improved artificial products of high tenacity and extensibility which comprises subjecting to saponification filaments, threads, ribbons, films and like products having a basis of nitrocellulose by treating the products with a liquid medium containing ethylene diamine.

9. Process of producing improved artificial products of high tenacity and extensibility which comprises subjecting to saponification filaments, threads, ribbons, films and like products having a basis of nitrocellulose by treating the products with a bath containing ethylene diamine under such conditions as to swell the products without incipient solution.

10. Process of saponifying filaments, threads, ribbons, films and like products having a basis of nitrocellulose comprising subjecting the products to the action of mono-methylamine in an aqueous bath containing a small quantity of copper under such conditions as to swell the products without incipient solution.

11. Process of saponifying filaments, threads, ribbons, films and like products having a basis of nitrocellulose comprising treating the products with a liquid medium containing a nitrogenous organic base in the presence of small quantities of a heavy metal selected from the group consisting of copper, silver, nickel and zinc.

12. Process of producing improved artificial products of high tenacity and extensibility which comprises subjecting to denitration filaments, threads, ribbons, films and like products having a basis of nitrocellulose, by subjecting the products to substantially complete saponification by treatment with a bath containing a nitrogenous organic base under such conditions as to swell the products without incipient solution.

HENRY DREYFUS.